United States Patent [19]

Gruehn et al.

[11] Patent Number: 4,796,137
[45] Date of Patent: Jan. 3, 1989

[54] PROTECTIVE JACKET FOR A DISK-SHAPED RECORDING MEDIUM

[75] Inventors: Dietrich Gruehn, Appenweier; Joachim Hack, Ludwigshafen; Hubert Fehrenbach, Kehl; Peter Rudolf, Fussgoenheim; Norbert Holl, Battenberg, all of Fed. Rep. of Germany

[73] Assignee: BASF Aktiengesellschaft, Ludwigshafen, Fed. Rep. of Germany

[21] Appl. No.: 919,043

[22] Filed: Oct. 15, 1986

[30] Foreign Application Priority Data

Oct. 15, 1985 [DE] Fed. Rep. of Germany ....... 8529251

[51] Int. Cl.$^4$ .................. G11B 23/033; B65D 85/57
[52] U.S. Cl. .................. 360/133; 206/313
[58] Field of Search ............ 206/312, 313, 444; 369/287, 289, 291; 360/133, 135; 428/284, 286, 287, 300, 196, 198; 156/583.1, 583.91, 290

[56] References Cited

U.S. PATENT DOCUMENTS

| | | | |
|---|---|---|---|
| 4,254,864 | 3/1981 | Mikura | 206/313 |
| 4,263,634 | 4/1981 | Chenoweth et al. | 360/133 |
| 4,391,669 | 7/1983 | Yamakawa et al. | 156/583.91 |
| 4,392,170 | 7/1983 | Okada | 360/133 |
| 4,414,597 | 11/1983 | Cornin | 360/133 |
| 4,451,520 | 5/1984 | Tecl et al. | 428/198 |
| 4,466,037 | 8/1984 | Yoshida et al. | 360/133 |
| 4,655,348 | 4/1987 | Takagi | 206/444 |

FOREIGN PATENT DOCUMENTS

| | | | |
|---|---|---|---|
| 53-103714 | 2/1977 | Japan | 360/133 |
| 53-110513 | 9/1978 | Japan | 206/313 |
| 53-110514 | 9/1978 | Japan | 360/133 |
| 57-86171 | 5/1982 | Japan | 360/133 |
| 61-87285 | 5/1986 | Japan | 360/133 |

Primary Examiner—Stuart N. Hecker
Assistant Examiner—Benjamin E. Urcia
Attorney, Agent, or Firm—Keil & Weinkauf

[57] ABSTRACT

In a protective jacket for disk-shaped recording media, for example magnetic films, fixed magnetic disks, grammophone disks or video disks, the fleece covering in the jacket is fastened close to the outer edges of the jacket and close to the contour lines of the openings by means of heat welded points a short distance apart and in the region inbetween at a distance apart which is several times as large. As a result of the cushions thus formed, a more advantageous cleaning effect is achieved.

17 Claims, 1 Drawing Sheet

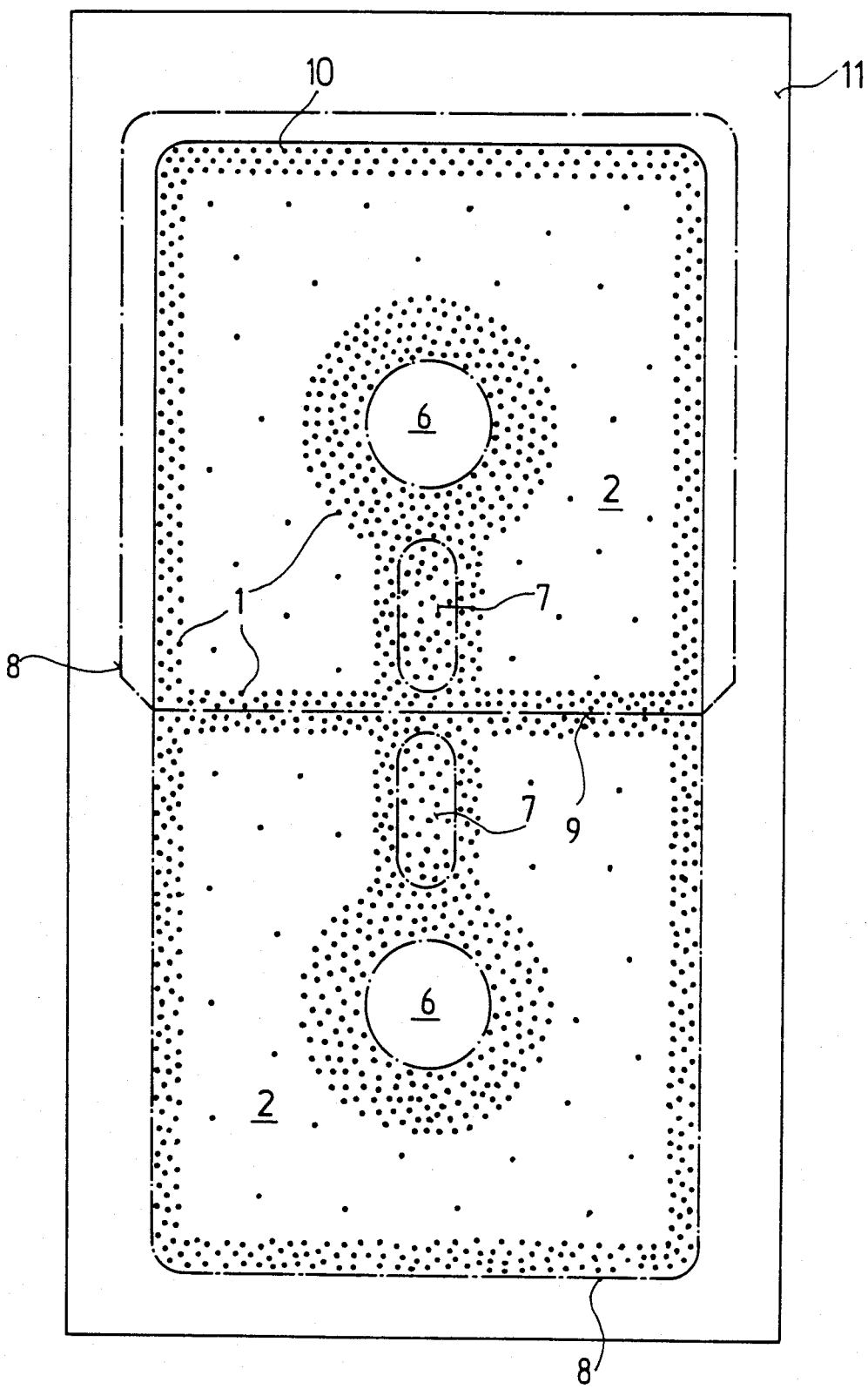

PROTECTIVE JACKET FOR A DISK-SHAPED RECORDING MEDIUM

BACKGROUND OF THE INVENTION AND PRIOR ART

This invention relates to a protective jacket for a disk-shaped recording medium, in particular a flexible data recording medium, comprising a blank of plastics material having openings therein, the blank being folded and joined together at at least two outer edges to form either a closed jacket or a jacket open along at most one edge, and a fleece covering attached to the blank by thermo-welding by means of needles producing needle weld points.

Such known protective jackets of the kind referred to for audio, video and data recording disks, films, X-ray plates, etc. are generally in the form of flat, square or reactangular envelope-like jackets. Regardless of the recording material which has been used in the particular recording medium, which may be capable of storing magnetic, optical or other signals, it is desirable to keep the recording medium free from dirt, dust, etc., in order to minimise the detrimental effect of such matter on the playback quality of the recorded signals. The danger of penetration of dust, etc. is even greater when the recording medium is removed from the jacket than in the case of a FlexyDisk ®, in which the recording medium, in the form of a magnetic film, is completely enclosed by the jacket except for a few openings, and also remains enclosed during the recording/playback operation.

® Registered trademark of BASF Aktiengesellschaft

FlexyDisk jackets are produced, for example, from a blank of thin rigid PVC film. Before being folded into a jacket-like form, the side which is later to be the inside of the jacket is provided with a liner made of nonwoven fabric, hereinafter also referred to as "fleece" or "fleece covering". The blank is punched to provide jacket openings. The blank is then folded to form a jacket and the side tabs, which project when the folding operation has been carried out, are folded over and welded to the sides of the jacket. A disk-shaped flexible carrier coated with magnetic dispersion is then inserted into the jacket, which is still open at one edge, after which an end tab of the jacket is folded and welded to the top edge of the jacket so that the magnetic film is thus protected and fully enclosed on all sides. The magnetic film remains inside the jacket when used in a FlexyDisk drive for recording/playback of signals.

German Laid-Open Application DOS No. 3,140,088 discloses a jacket for a magnetic film which is provided on the inside, on both sides of the magnetic film, with linings of a plastic fibre material. This lining material is spot welded to the jacket with some or all of the weld points arranged radially with respect to the magnetic film to provide a sinusoidal cross-sectional contour, across which the magnetic film constantly passes during rotation to effect a thorough cleaning. Mounting the cleaning linings at pre-determined points entails a certain amount of expense in terms of apparatus and control in the production of the jacket.

German Laid-Open Application DOS No. 2,912,064 discloses another jacket for FlexyDisks which possesses buffing material consisting of fleece on the inner surfaces on both sides of the magnetic film. The buffing material is attached to the jacket material via adhesive bonds, either along straight or circular lines. Apart from the potential damage to the recording medium caused by the adhesive, another disadvantage found is that, in relation to the jacket, the points of attachment are lower than the intermediate areas, so that substantial, harmful friction occurs during rotation of the magnetic film and may cause scraping of the film and hence also damage to the magnetic surface.

OBJECTS AND SUMMARY OF THE INVENTION

It is an object of the present invention to provide a protective jacket with a cleaning fleece which is simpler to mount and more effective in operation than known fleeces.

We have found that this object is achieved, according to the invention, if the fleece covering is fastened to the blank in the regions close to the outer edges of the jacket and in the regions adjacent the outlines of said openings by means of closely spaced apart needle weld points having a short spacing between one another, and wherein, in the region between the said closely spaced apart needle weld points, the fleece covering is fastened to the blank by means of relatively widely spaced apart needle weld points having a wide spacing which is several times larger than said short spacing.

With a jacket according to the invention it is possible for the fleece covering to have a padded form over a large surface area, compared with known fleeces having a cushion character which have large accurately limited individual areas.

During production, it is advantageous if the cushion welding, i.e. the regions having the lower density of needle welds where the majority of "cushions" are formed to give the fleece its padded form, is carried out either directly after or simultaneously with welding of the edges of the fleece covering. Furthermore the individual welds can be carried out randomly, i.e. controlled via a random generator.

For example, it is possible to use a packet of needles as in a thermo-printer and activate needles at random under the control of a random generator.

The advantageous result is that improved wiping and cleaning contact of the fleece covering with the recording medium is obtained, and this contact can even be adjusted. The transient read/write errors caused in the prior art by dust, fluff or dirt particles are greatly reduced or even completely avoided by the novel protective jacket, particularly since it is possible to use a fluff-free fleece as there is no need to employ a fluffy, and therefore fluff-producing, fleece, as is usually the case. Another important advantage is obtained by virtue of the fact that there are no longer just a few large wiping zones which are effective, as in the conventional case, but instead there are a plurality of individual "cushions" which can pick up every piece of fluff and every dust and dirt particle, these cushions not being restricted to performing a cleaning action just in the small areas of the wiping zones which are effective close to the read/write opening, as is usually the case. Furthermore, the pressure contact of the fleece with the surfaces of the recording medium is maintained when the latter is outside the drive. The particles embedded in the fleece remain in their position. In the conventional protective jackets there is no pressure contact after removal from the drive. The flexible jacket surfaces then spring back to their initial position, forming a gap between themselves and the recording medium. Consequently, there is no longer any guarantee that the particles previously held firmly will remain embedded in the fleece, especially since the wiping contact is concentrated in only one area, leading to saturation of the dirt pick-up capacity.

Some of the above advantages are obtained if, in a further embodiment of the protective jacket, the needle weld points between the blank and the fleece covering are arranged at irregular distances apart to form individual padded "cushions" having irregular shapes. The reason for this irregular spacing is that it helps to avoid the buildup of regular patterns of dust or dirt particles. As a result of the irregular spacing cushions with different shapes, different surfaces and different heights are produced. Different cleaning effects are thus obtained and, more particularly, the cushions are effective to hold the particles in differently high planes of the fleece.

It is also advantageous if the fleece covering is exposed to elevated temperatures to cause it to shrink, and is then fastened to the blank by means of heated needles when in its shrunken state. The fleece covering is generally in a shrunken state when it is exposed to elevated temperatures and fastened in this state.

It is also advantageous if the fleece covering comprises a polypropylene or polyester mat in which the continuous spun filaments are thermally welded, in particular spot welded, to one another. This gives fleece coverings which are advantageous with regard to production and which are fluff-free.

It is also advantageous if the material of the fleece covering is provided with hygroscopic additives in order to increase moisture absorption in an advantageous manner.

The material of the fleece covering may advantageously also be rendered antistatic so that the electrostatic charge can additionally be reduced.

Advantageously, an antistatic can also be provided on that side of the blank which is not covered with the fleece, in order to reduce the charge there too.

It is advantageous if the effective cushion height of the fleece covering is adjusted to be from about 200 to about 500 $\mu$m in order to achieve optimum wiping contact, for example for 5¼ inch FlexyDisks.

In another version, it is advantageous if antistatic properties are provided by a conductive coating, which is applied as a thin flexible film onto the upper surface of the fleece covering and, if necessary, onto the back of the blank.

BRIEF DESCRIPTION OF THE DRAWING

An embodiment or the invention will now be described by way of example with reference to the drawing, the sole figure of which shows a fleece covering laminated to a blank prior to performing a punching operation.

DETAILED DESCRIPTION OF THE PREFERRED EMBODIMENT

The figure shows a blank 11 of thin rigid sheet material, e.g. PVC, on which a fleece 10 is secured by means of a plurality of needle weld points arranged in areas 1 and 2, areas 2, as will be noted from the drawing, being relatively large compared with areas 1. The jacket is formed by punching the main outline along the dot-dash punch line 8, punching out the openings 6 and 7 and subsequently folding the punched blank about a transverse folding line 9. The areas 1 are located adjacent the edges of the fleece covering 10, adjacent the central folding line 9 and around the punch lines for forming the central openings 6 and read/write openings 7. The areas 2 are enclosed by the areas 1. In the areas 1, the distance a between the weld points is about the same as the usual distance of a=from about 2 to 4 mm. In the area 2 enclosed by areas 1 the weld point spacing b is greater than a and is typically from about 15 to 25 mm. The density of the weld points is thus substantially lower in areas 2 than in areas 1.

The fleece material, for example a polypropylene mat consisting of, for example, continuous spun filaments suitably connected to one another, e.g. welded, is advantageously heated to about 100° C. before the lamination process; this causes it to shrink by about 0.5%, based on the length at room temperature.

Along the contour to be punched (cf. the dot-dash punch lines 8) and the future folding line 9, the heated fleece 10 is laminated by means of thermo-welding by needles with a weld point spacing a (area 1). The additional fastening of the fleece 10 to the blank 11, is effected in the enclosed area 2. Over the next few hours, the hygroscopic fleece 11 absorbs moisture at room temperature and the usual atmospheric humidity, with the result that it becomes longer and bulges between the weld points to give padded or cushion-like raised regions of different areas. As shown in the figure, the individual cushions formed by the relatively widely spaced weld points in areas 2 are of at least tri-cornered shape. The height h of the cushion-like raised regions can be adjusted since it is directly dependent on the fleece material employed and the distance between the weld points (which can be appropriately adjusted). Punching of the jacket can be carried out at any stage, but the blank material should be at room temperature.

As a result of subsequent heating of the blank 11 with the fleece covering laminated thereto, the blank material can expand without hindrance since the filaments of the fleece covering 10 do not become any shorter than their length prior to the lamination process, so that the raised cushions become flatter but do not produce any stress in the blank material. Thus, curvature of the heated blank parts 11 is effectively prevented. The conventional, separate heating of the blank 11 prior to lamination, can be avoided for the same reason and hence savings made.

Because of the hygroscopic behavior of conventional fleeces, which can be reinforced by treatment with hygroscopic additives, in general by hygroscopic antistatics, the lengthening of the filaments, which is desirable, surprisingly makes it possible to achieve reproducible, defined cushion formation. Furthermore, the ohmic resistance is reduced, advantageously to a value close to the ohmic resistance of the magnetic layer (about $10^6$ in the case of a chromium dioxide layer) or lower, with the result that electrostatic charge build up and the errors which it causes can be virtually prevented. It is also possible to use additives possessing hygroscopic and/or antistatic properties in conjunction with the fleece covering and, if required, also on the blank (i.e. on the outside of the protective jacket).

The fleece material should in any case be chosen so that the length of its filaments or of its filament bundles decreases in a reproducible manner on heating and increases in a reproducible manner on absorption of moisture, so that cushions of defined length and height are formed.

For 5¼" magnetic films (FlexyDisks), a cushion height of from about 800 to about 950 $\mu$m is regarded as advantageous in the unfolded blank, while the effective cushion height in the folded state is from about 200 to about 500 μm, depending on the thickness of the fleece present. These dimensions can advantageously be achieved in practice with, for example, polypropylene and polyester mats. With a protective jacket provided with a fleece covering of this type, excellent results with zero errors, zero repeats and zero reverses were obtained, regardless of whether precleaning had been carried out or antistatic treatment was present. Testing was carried out using an IBM personal computer in conjunction with a BASF 6108 FlexyDisk Drive from BASF Aktiengesellschaft.

Other fleeces which can be used for the purposes of the present invention include all types of polyester mats as cleaning fleece.

Heat bonded polyester staple with antistatic 743 from BASF Aktiengesellschaft, Ludwigshafen, can particularly advantageously be used according to the invention.

In order to increase the conductivity of the fleece covering, it is possible to treat it on the lower or upper surface with a conductive finish, for example a conductive coating solution.

It was possible to reduce transient errors by a factor of from 2 to 3 compared with commercial FlexyDisks.

We claim:

1. A protective jacket for a disk-shaped recording medium, in particular a flexible data recording medium, comprising a blank of plastics material having openings therein, the blank being folded and joined together at least two outer edges to form either a closed jacket or a jacket open along at most one edge, and a fleece covering attached to the blank by thermo-welding by means of needles producing needle weld points, wherein the fleece covering is fastened to the blank in the regions close to the outer edges of the jacket and in the regions adjacent the outlines of said openings by means of closely spaced apart needle weld points having a short spacing between one another, and wherein, in the relatively large regions between the regions which include said closely spaced apart needle weld points, the fleece covering is fastened to the blank by means of relatively widely spaced apart needle weld points having a wide spacing which is more than two times larger than said short spacing so that over said relatively large regions a padded form including a plurality of at least tri-cornered individual cushions is imparted to said fleece covering.

2. A protective jacket as claimed in claim 1, wherein the widely spaced apart needle weld points are spaced apart at irregular distances so that the cushions formed are of non-uniform shape.

3. A protective jacket as claimed in claim 2, wherein the fleece covering has been pre-shrunk, by being subjected to elevated temperatures, when fastened to the blank by said needle weld points.

4. A protective jacket as claimed in claim 1, wherein the fleece covering comprises a polypropylene mat having continuous spun filaments thermally welded to one another.

5. A protective jacket as claimed in claim 1, wherein the fleece covering comprises a polyester mat having continuous spun filaments thermally welded to one another.

6. A protective jacket as claimed in claim 1, wherein the material of the fleece covering is provided with antistatic means in the form of hygroscopic additives.

7. A protective jacket as claimed in claim 6, wherein antistatic means is also applied to the side of the blank which faces away from the fleece covering.

8. A protective jacket as claimed in claim 6, wherein the antistatic means is a conductive coating, which is applied as a thin flexible film onto the outside of the fleece covering.

9. A protective covering as claimed in claim 1, wherein the effective peak height of the fleece covering in the regions between the needle weld points of said closely spaced apart needle weld points is from about 200 to about 500 μm.

10. A protective jacket for a disk-shaped recording medium, in particular a flexible data recording medium, comprising a blank of plastics material having openings therein, the blank being folded and joined together at least two outer edges to form either a closed jacket or a jacket open along at most one edge, and a fleece covering attached to the blank by thermo-welding by means of needles producing needle weld points, wherein the fleece covering is fastened to the blank in the regions close to the outer edges of the jacket and in the regions adjacent the outlines of said openings by means of closely spaced apart needle weld points having a first, short spacing between one another, and wherein, in the relatively large regions between said relatively closely spaced apart needle weld points, the fleece covering is fastened to the blank by means of relatively widely spaced apart needle weld points having a second, wide spacing which is more than two times larger than said first, short spacing so that over said relatively large regions a padded form including a plurality of at least tri-cornered individual cushions is imparted to said fleece covering, and wherein the widely spaced apart needle weld points are spaced apart at irregular distances so that the cushions formed are of non-uniform shape.

11. A protective jacket as claimed in claim 10, wherein the fleece covering has been pre-shrunk, by being subjected to elevated temperatures, when fastened to the blank by said needle weld points.

12. A protective jacket as claimed in claim 10, wherein the fleece covering comprises a polypropylene mat having continuous spun filaments thermally bonded to one another.

13. A protective jacket as claimed in claim 10, wherein the fleece covering comprises a polyester mat having continuous spun filaments thermally bonded to one another.

14. A protective jacket as claimed in claim 10, wherein the material of the fleece covering is provided with antistatic means in the form of hygroscopic additives.

15. A protective jacket as claimed in claim 14, wherein antistatic means is also applied to the side of the blank which faces away from the fleece covering.

16. A protective jacket as claimed in claim 14, wherein the antistatic means is a conductive coating, which is applied as a thin flexible film onto the outside of the fleece covering and also onto the side wall of the blank which faces away from the fleece covering.

17. A protective covering as claimed in claim 10, wherein the effective peak height of the fleece covering in the regions between the needle weld points of said closely spaced apart needle weld points is from about 200 to about 500 μm.

* * * * *

UNITED STATES PATENT AND TRADEMARK OFFICE
CERTIFICATE OF CORRECTION

PATENT NO.  : 4,796,137
DATED       : Jan. 3, 1989
INVENTOR(S) : Gruehn et al.

It is certified that error appears in the above-identified patent and that said Letters Patent is hereby corrected as shown below:

Col. 5, line 32  after "at" insert -- at --

" . 6,    "  18  after "at" insert -- at --

Signed and Sealed this

Twelfth Day of December, 1989

Attest:

JEFFREY M. SAMUELS

Attesting Officer          Acting Commissioner of Patents and Trademarks